United States Patent
Soh et al.

(10) Patent No.: US 9,465,274 B1
(45) Date of Patent: Oct. 11, 2016

(54) HIGH-YIELD ENTANGLED SINGLE PHOTON SOURCE

(71) Applicant: Sandia Corporation, Albuquerque, NM (US)

(72) Inventors: Daniel B. S. Soh, Pleasanton, CA (US); Scott E. Bisson, Livermore, CA (US)

(73) Assignee: Sandia Corporation, Albuquerque, NM (US)

( * ) Notice: Subject to any disclaimer, the term of this patent is extended or adjusted under 35 U.S.C. 154(b) by 146 days.

(21) Appl. No.: 14/255,003

(22) Filed: Apr. 17, 2014

Related U.S. Application Data (60) Provisional application No. 61/818,363, filed on May 1, 2013.

(51) Int. Cl.
  *G02F 1/35* (2006.01)
  *G02F 1/365* (2006.01)
  *G02F 1/377* (2006.01)

(52) U.S. Cl.
  CPC ............ *G02F 1/365* (2013.01); *G02F 1/3526* (2013.01); *G02F 1/3536* (2013.01); *G02F 1/377* (2013.01); *G02F 2203/26* (2013.01)

(58) Field of Classification Search
  CPC ..... G02F 1/365; G02F 1/377; G02F 2203/26
  See application file for complete search history.

(56) References Cited

U.S. PATENT DOCUMENTS

| | | | |
|---|---|---|---|
| 7,373,059 B2 * | 5/2008 | Spillane | B82Y 10/00 250/216 |
| 7,489,436 B1 * | 2/2009 | Fiorentino | G02F 1/39 359/326 |

(Continued)

OTHER PUBLICATIONS

Lin, et al., "Photon-Pair Generation in Optical Fibers Through Four-Wave Mixing: Role of Raman Scattering and Pump Polarization", Physical Review A 75, Feb. 1, 2007, pp. 1-20.

(Continued)

*Primary Examiner* — Daniel Petkovsek
(74) *Attorney, Agent, or Firm* — Medley, Behrens & Lewis, LLC (57) ABSTRACT

The various technologies presented herein relate to utilizing photons at respective idler and signal frequencies to facilitate generation of photons at a pump frequency. A strong pump field can be applied at the $\omega_i$ and the $\omega_s$ frequencies, with the generated idler and signal pulses being utilized to generate a photon pair at the $\omega_p$ frequency. Further, the idler pump power can be increased relative to the signal pump power such that the pump power $P_i$>pump power $P_s$. Such reversed operation (e.g., $\omega_i + \omega_s \rightarrow \omega_{p1} + \omega_{p2}$) can minimize and/or negate Raman scattering effects. By complying with an energy conservation requirement, the $\omega_i$ and $\omega_s$ photons interacting with the material through the four-wave mixing process facilitates the entanglement of the $\omega_{p1}$ and $\omega_{p2}$ photons. The $\omega_i$ and $\omega_s$ photons can be respectively formed in different length waveguides with a delay utilized to facilitate common timing between the $\omega_i$ and $\omega_s$ photons.

17 Claims, 6 Drawing Sheets

(56) References Cited

U.S. PATENT DOCUMENTS

| | | | | |
|---|---|---|---|---|
| 7,639,953 | B2* | 12/2009 | Spillane | B82Y 10/00 |
| | | | | 250/214.1 |
| 7,764,423 | B2* | 7/2010 | McKinstrie | G02F 1/3536 |
| | | | | 359/326 |
| 8,242,435 | B2* | 8/2012 | Arahira | G02F 1/39 |
| | | | | 250/251 |
| 8,270,842 | B2* | 9/2012 | Watanabe | G02F 1/3534 |
| | | | | 398/152 |
| 8,676,063 | B2* | 3/2014 | Arahira | H04B 10/70 |
| | | | | 398/182 |
| 8,773,753 | B2* | 7/2014 | Kato | G02F 1/395 |
| | | | | 359/330 |
| 2009/0022322 | A1* | 1/2009 | Trifonov | H04L 9/0852 |
| | | | | 380/278 |

OTHER PUBLICATIONS

Clemmen, et al., "Quantum Theory of Degenerate Four-Wave Mixing and Raman Scattering in Fibers", Proceeds Symposium IEEE/LEOS Benelux Chapter, 2007, pp. 1-4.

Fulconis, et al., "High Brightness Single Mode Source of Correlated Photon Pairs Using a Photonic Crystal Fiber", Optical Society of America, 2005, pp. 1-11.

Fulconis, et al., "Nonclassical Interference and Entanglement Generation Using a Photonic Crystal Fiber Pair Photon Source", Physical Review Letters, Sep. 21, 2007, pp. 1-4.

Rarity, et al., "Photonic Crystal Fiber Source of Correlated Photon Pairs", Optics Express, vol. 13, No. 2, Jan. 24, 2005, pp. 1-11.

Balic, et al., "Generation of Paired Photons with Controllable Waveforms", Physical Review Letters, May 13, 2005, pp. 1-4.

\* cited by examiner

HIGH-YIELD ENTANGLED SINGLE PHOTON SOURCE

RELATED APPLICATION

This application claims priority to U.S. Provisional Patent Application No. 61/818,363, filed on May 1, 2013, entitled "HIGH-YIELD ENTANGLED PHOTO SOURCE AND QUANTUM ONE-TIME PAD", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A number of technologies, such as quantum communication, quantum calculation, etc., rely on a source of photon pairs (e.g., an entangled photon pair comprising an idler photon, $\omega_i$, and a signal photon, $\omega_s$) which can facilitate confirmation that a received photon pair is valid. Conventional approaches to providing the photon pairs include parametric down conversion (PDC) which can utilize bulk optics, and also four-wave mixing (FWM) which can utilize fiber optics. A detriment of PDC is that the direction of the photon pair is completely random, hence a pair of photons can be symmetrically opposite but no prediction can be made with regard to the photon direction in either of the positive direction of a first photon or a negative direction of a second photon. Accordingly, large bulk optic lenses are utilized to facilitate capturing as many photons as possible across the range of potential directions, while the collected number of photons is limited by the acceptance angle of the device receiving the photons.

The problem of photon directionality can be addressed by FWM in a waveguide based system, but owing to such effects as Raman scattering, a conventional approach of generating $\omega_i$ and $\omega_s$ based upon a pulse comprising a pair of pumped photons $\omega_{p1}$ and $\omega_{p2}$ can lead to uncertainty regarding whether the $\omega_i$ and $\omega_s$ photons have been formed and received as expected.

Figure 7:
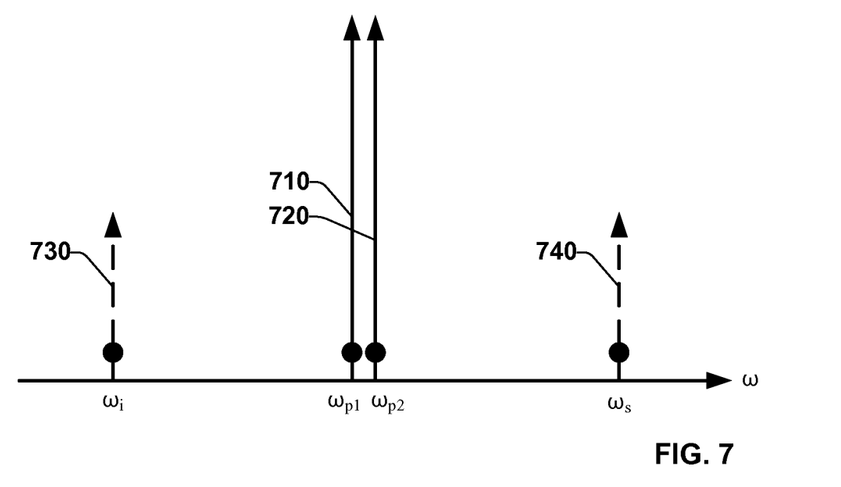
FIG. 7 illustrates a block diagram of utilizing pump photons to generate idler and signal photons.
Figure 8:
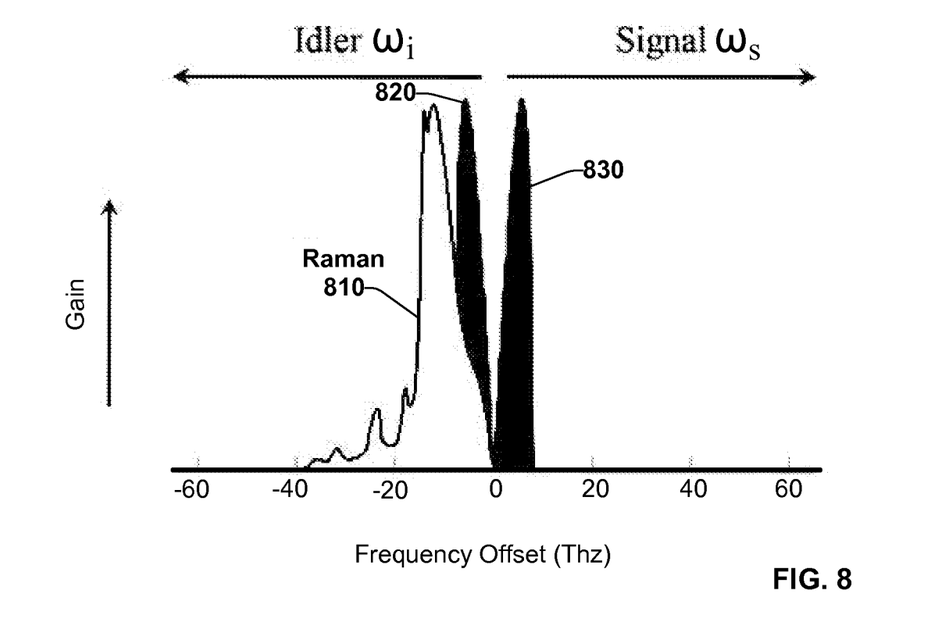
FIG. 8 is a chart depicting Raman scattering.

For instance, with reference to FIGS. 7 and 8, an idler photon $\omega_i$, in idler pulse 730, and a signal photon $\omega_s$, in signal pulse 740, are generated by a pair of pump photons $\omega_{p1}$ and $\omega_{p2}$, in pump pulses 710 and 720, where for degenerate FWM, $\omega_{p1}$ and $\omega_{p2}$ can have a common frequency, $\omega_p$. As shown in FIG. 7, the frequency of the respective pulses are $\omega_i \omega_p \omega_s$. In an aspect, the photon pairs can be generated at frequencies $\omega_i$ and $\omega_s$ by inserting a strong field at the pump frequencies $\omega_p$, hence $\omega_p$ acts doubly as $\omega_{p1}$ and $\omega_{p2}$. Each pair of pump photons, $\omega_{p1}$ and $\omega_{p2}$, are effectively destroyed in a pump pulse during the energy exchange occurring between the destroyed pump photons $\omega_{p1}$ and $\omega_{p2}$, and the newly created $\omega_i$ and $\omega_s$. Accordingly, per a spontaneous FWM process, the pumped pair $\omega_{p1}$ and $\omega_{p2}$ disappear and the idler/signal pair $\omega_i$ and $\omega_s$ arise, or the idler/signal pair $\omega_i$ and $\omega_s$ disappear and the pumped pair $\omega_{p1}$ and $\omega_{p2}$ arise.

A rate of generation of a photon pair $\omega_i$ and $\omega_s$, rate $r_1$, can be determined in accordance with Equation 1:

$$r_1 \propto \gamma^2 P_{p1} P_{p2} \int \int sinc\left(\frac{\Delta kL}{2}\right) \exp\left[-\frac{(\Delta\omega_{p1} + \Delta\omega_{p2})^2}{2\sigma^2}\right] d\omega_{p1} d\omega_{p2} \quad \text{Eqn. 1}$$

where $\gamma$=nonlinearity coefficient of a fiber, $P_{p1}$=pump power at $\omega_{p1}$, $P_{p2}$=pump power at $\omega_{p2}$, k=phase propagation constant, L=fiber length, $\omega_i$=idler photon wavelength, $\omega_{p1,2}$=pump photon frequencies, $\sigma$=spectral bandwidth of pump pulses.

Further, for a high efficiency of operation in generating photons at $\omega_i$ and $\omega_s$ there is a requirement for two conditions to be satisfied: (a) energy conservation and (b) momentum of conservation (also referred to as phase matching). Energy conservation indicates that a photon pair will always exist, hence, if two existing photons are destroyed at the pump then two new photons will be formed, one idler photon in the idler pulse and one signal photon in the signal pulse, per Equation 2:

$$\omega_s + \omega_i - 2\omega_p = 0 \quad \text{Eqn. 2}$$

The momentum of conservation is satisfied per Equation 3:

$$k_s + k_i - 2k_p - 2\gamma P_p = 0 \quad \text{Eqn. 3}$$

where $k_s$, $k_i$, and $k_p$ are the respective propagation constants for the respective $\omega_i$, $\omega_s$, and $\omega_{p1}$ & $\omega_{p2}$, for a forward mixing gain, while the fiber nonlinearity $\gamma$ in conjunction with the pump power P can provide a measure of the effect of the fiber nonlinearity for a given pump power.

Theoretically, the total photon distribution between $\omega_{p1}$ & $\omega_{p2}$ and $\omega_i$ & $\omega_s$ should be preserved. Unfortunately, various deleterious effects can affect generation and/or propagation of the various photons, such an effect being Raman scattering which can scatter photons into different wavelengths, e.g., by a non-linear mechanism. FIG. 8 presents a Raman scattering effect and an associated frequency and bandwidth offsets for photons generated by an oscillator. The Raman gain shape 810 is presented along with theoretical gain shapes 820 (for the $\omega_i$ photon) and 830 (for the $\omega_s$ photon), each gain shape has been normalized individually. In an aspect, the idler photon and signal photon frequencies are determined by the propagation constants and the nonlinearity of the waveguide, per Eqn. 3. It is to be noted that the Raman scattering only occurs on the idler side of the frequency range in optical fibers, with a peak generation of about −13 THz, which is the resonant frequency between molecular heat and molecular vibration of a waveguide molecular lattice. In other words, fiber material only dissipates energy from the optical waves to the heat bath (converting high energy, high frequency photons to lower energy, lower frequency, photons), instead of adding energy to the optical wave. Which process dominates depends on material characteristics.

In a waveguide (e.g., a fiber) carrying a $\omega_i$ photon, Raman scattering 810 can add an uncorrelated photon at $\omega_i$, which confuses the photon number entanglement between $\omega_i$ and $\omega_s$. Ideally, a transference of energy between the light field (e.g., the $\omega_p$ photon) and the waveguide molecules is a lossless operation. However, owing to each waveguide molecule being connected to adjacent molecules, some of the transferred energy can be lost as heat radiation dissipating throughout the waveguide structure as the molecular lattice vibrates under the stimulation of the impinging $\omega_p$ photon. The loss of energy to the molecular lattice leads to the overall energy no longer being available to form a photon(s) of the same optical equivalent (e.g., wavelength, frequency, etc.) as that of the impinging $\omega_p$ photon; any new photon which is formed in the waveguide will re-enter the light field but with an energy smaller than that of the impinging $\omega_i$ photon. This Raman process is separate from the desired four-wave mixing process. The consequence of the addition of a photon on the idler frequency via the Raman process is that the number of photons between the idler and that of the signal may differ. To facilitate measurement of the $\omega_i$ photon(s) and the $\omega_s$ photon(s), the respective photons can be split and directed to two separate optical waveguide paths, e.g., an idler leg and a signal leg. A count can be taken on each of the legs to determine the number of $\omega_i$ photon(s) vs. the number of $\omega_s$ photon(s), with, theoretically, the entangled photons generating the same number of photons on both legs. However, per the above, the number of $\omega_i$ photons on the idler leg can be greater than the number of $\omega_s$ photons on the signal leg. The correlation of photons on each leg of a conventional system is no longer 100% pure owing to the Raman scattering contamination.

Figure 9:
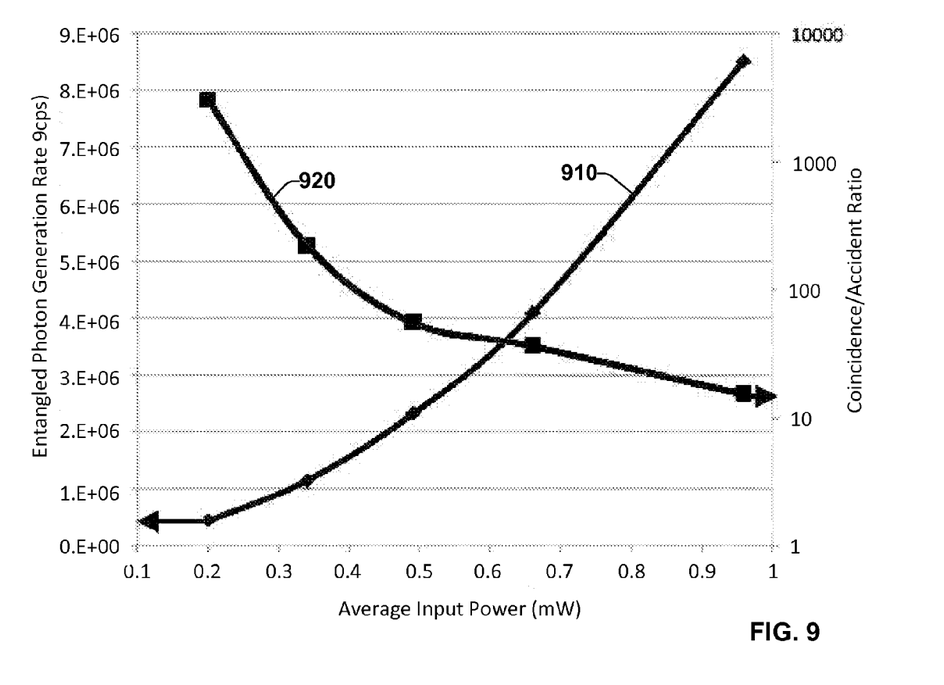
FIG. 9 is a chart depicting photon generation and coincidence/accidence for an input power.

As shown in FIG. 9, as the rate of generation of the various photons is increased, so the number of unwanted photons being generated as a function of Raman scattering is also increased. Plot 910 indicates an increase in the rate of entangled photon generation (count per second, cps) as the pump input power is increased from about 0.2 mW to about 1.0 mW. However, as the pump input power is increased there is a corresponding increase in the number of unwanted photons formed, per plot 920, where plot 920 is a plot of pump input power vs. coincidence/accident ratio (plotted in log scale). Coincidence indicates that the number of photons on the idler leg and the signal leg are equal, e.g., for each idler photon there is a corresponding signal photon. Accident indicates the number of photons which are different between the idler leg and signal leg, e.g., there may be X idler photons vs. Y signal photons where X>Y. At about 0.2 mW, plot 920 indicates a coincidence/accident ratio of between about 1 in 1000 and about 1 in 10,000. At about 1 mW, plot 920 indicates the coincidence/accident ratio has reduced to about 1 in 10, a high degree of Raman scattering contamination is occurring. Hence, while increasing the pump input power (per Eqn. 1, where $r_1$ is squarely proportional to the pump power $P_p^2$) increases the rate at which the entangled photons are formed, the increased pump input power also results in an increase in the number of unwanted electrons formed. Furthermore, as shown in FIG. 8, the Raman spectrum has such a broad spectrum that it can be difficult to avoid when using a conventional FWM degenerate pumping approach.

Hence, for a system operating based upon detection of a co-formed photon pairing comprising of a $\omega_i$ and $\omega_s$, the effects of (a) the shifting of the $\omega_i$ photon, and/or (b) generation of further $\omega_i$ photons from an originating $\omega_i$ photon can lead to an erroneous determination that a received pair of photons $\omega_i$ and $\omega_s$ are actually correlated (e.g., are the original entangled pair). While the FWM mechanism is elastic in terms of energy conservation, Raman scattering fails to conserve the energy leading to breakage of the photon entanglement which can be detrimental to many quantum-based operations. For example, numerous quantum information science applications requires true single-photon source. Having a perfect correlation between the number of photons at the idler and the signal frequencies, one can gate the output of the signal frequency while counting the photons at the idler frequency. Only when the counted number of photons at the idler frequency is one, the gate at the signal frequency opens letting the signal photon out. This is one way of realizing a true single photon source using a perfectly entangled photon pair source. Especially quantum communication strictly requires only one photon at a time. Otherwise, an eavesdropper can tap the extra photon and obtain the information while being unnoticed.

SUMMARY

The following is a brief summary of subject matter that is described in greater detail herein. This summary is not intended to be limiting as to the scope of the claims.

Various exemplary embodiments presented herein relate to formation of entangled photons. In an exemplary embodiment a method is presented, the method comprising forming an idler photon, wherein the idler photon has a first resonant frequency and forming a signal photon, wherein the signal photon has a second resonant frequency. The method further comprising combining the idler photon and the signal photon to form a pair of pump photons, wherein the pump photons have a third resonant frequency. In an embodiment, the first resonant frequency can be less than the third resonant frequency, and the third resonant frequency can be less than the second resonant frequency.

Another exemplary embodiment presents a system comprising an idler photon having a first resonant frequency and a signal photon having a second resonant frequency. The system further comprising a waveguide configured to interact with the idler photon and the signal photon to form a pair of pump photons, wherein the pump photons have a third resonant frequency. In an embodiment, the first resonant frequency can be less than the third resonant frequency, and the third resonant frequency can be less than the second resonant frequency.

A further exemplary embodiment for forming photon pairs is presented, wherein the embodiment is a system comprising an oscillator configured to generate a first photon and a second photon, wherein the first photon and the second photon can be entangled. The system can further comprise a first waveguide configured to convey the first photon, wherein the first waveguide has a first length, the first photon interacting with the waveguide to facilitate a shift in a first wavelength of the first photon to a second wavelength. The system can further comprise a second waveguide configured to convey the second photon, wherein the second waveguide has a second length, and the second photon can interact with the waveguide to facilitate a shift in a third wavelength of the second photon to a fourth wavelength. In an embodiment, the second waveguide can be shorter than the first waveguide and a time to convey the second photon through the second waveguide can be less than a time to convey the first photon through the first waveguide. The system can further comprise a delay component located at the second waveguide, wherein the delay component can be configured to delay the second photon by a time of duration equal to a difference in the time to convey the second photon through the second waveguide and the time to convey the first photon through the first waveguide. The system can further comprise a multiplexer configured to recombine the first photon with the second photon to form a second pulse. The system can further comprise a third waveguide configured to convey the second pulse, wherein the first photon and the second photon can interact with the third waveguide to facilitate formation of a pair of photons. In an embodiment the pair of photons can have a frequency different to a frequency of the first photon and to a frequency of the second photon.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

DETAILED DESCRIPTION

Various technologies pertaining to the formation of a photon either as a single photon, or a photon pair are presented, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

In an embodiment, a strong pump field can be applied at the $\omega_i$ and the $\omega_s$ frequencies, with the generated idler and signal pulses being utilized to generate a photon pair at the $\omega_p$ frequency. Further, the idler pump power can be increased relative to the signal pump power such that the pump power $P_i$>pump power $P_s$. Such reversed operation (e.g., $\omega_i+\omega_s \rightarrow \omega_{p1}+\omega_{p2}$) can minimize and/or negate the Raman scattering effect for a FWM-based operation. By complying with the energy conservation requirement, per Eqn. 2, the $\omega_{p1}$ and $\omega_{p2}$ photons are entangled, and hence in an aspect, can be indistinguishable. In another aspect, e.g., to satisfy an application requirement, $\omega_{p1}$ and $\omega_{p2}$ can be distinguishable by such techniques as polarization, by wavelength based on waveguide design, etc. The various waveguides presented herein can act in a nonlinear manner (e.g., as a third order, $\chi^{(3)}$, nonlinear process), and hence operate with four lightwaves or pulses having disparate optical frequencies or wavelengths.

Figure 1:
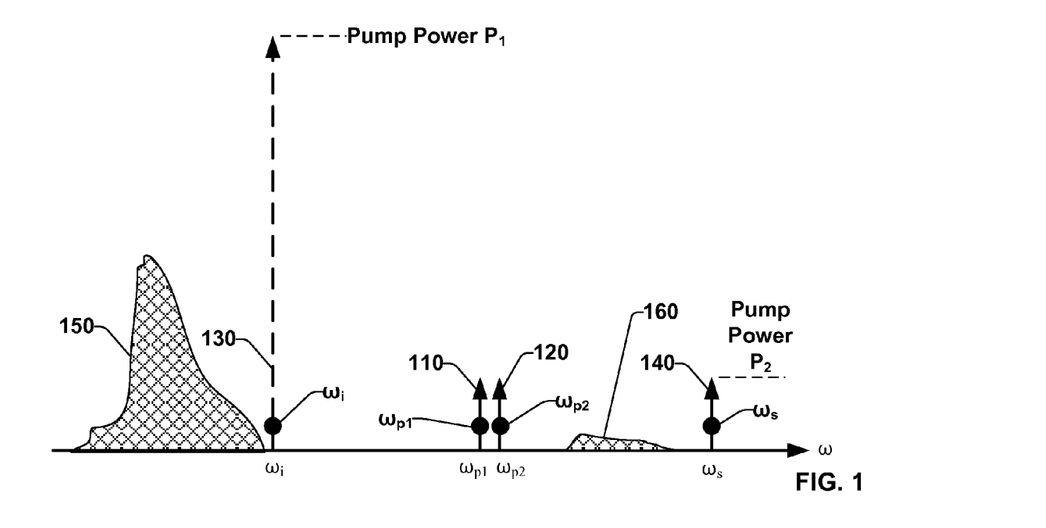
FIG. 1 illustrates a block diagram of utilizing idler and signal photons to generate photons at a pump frequency, according to an embodiment.

As shown in FIG. 1, rather than utilizing the pumped pair of photons $\omega_{p1}$ and $\omega_{p2}$ to generate a pair of photons $\omega_i$ and $\omega_s$, the operation is effectively reversed whereby the $\omega_i$ and $\omega_s$ photons are pumped to form a pair of photons $\omega_{p1}$ and $\omega_{p2}$. Hence, while Raman scattering effects can be encountered, e.g., regions 150 and 160, the effects can be avoided by utilizing $\omega_{p1}$ and $\omega_{p2}$ as the photons which are transmitted into a photonic crystal fiber (PCF), whereby the respective wavelengths of photons $\omega_i$ and $\omega_s$ can be selected to avoid the wavelength(s) at which Raman scattering can occur.

In comparison with Eqn 1, a rate, $r_2$, of generation of a photon pair $\omega_{p1}$ and $\omega p2$ can be determined in accordance with Equation 4:

$$r_2 \propto \gamma^2 P_s P_i \int\int sinc\left(\frac{\Delta kL}{2}\right) \exp\left[-\frac{(\Delta\omega_s + \Delta\omega_i)^2}{2\sigma^2}\right] d\omega_s d\omega_i \quad \text{Eqn. 4}$$

where the rate of photon pair generation $r_2$ is proportional, in part, to the product of the two pump powers $P_s$ and $P_i$. Owing to $r_2$ being proportional to the product of the two pump powers $P_s$ and $P_i$ the respective pump powers $P_s$ and $P_i$ do not have to be identical. Accordingly, in an embodiment the power at $P_s$ can be limited while the power $P_i$ can be increased which correspondingly increases $r_2$. In a further embodiment, the power at $P_i$ can be limited while the power $P_s$ can be increased which correspondingly increases $r_2$. In an aspect, consideration may have to be given to the available pump power that can be applied to $P_s$ when increasing the pump power $P_i$. In an aspect, the rate of generation of entangled pairs $\omega_i$ and $\omega_s$ can be increased by utilizing PCF.

In another embodiment, when photons $\omega_i$ and $\omega_s$ are pumped with a respective orthogonal polarization (e.g., s⊥i), photons $\omega_{p1}$ and $\omega_{p2}$ can be formed in an entangled state which satisfies the Bell state (e.g., having the simplest possible examples of entanglement in accordance with the Bell inequality). As shown in FIG. 1, the power $P_i$ can be increased in orders of magnitude higher than can be achieved with conventional degenerate FWM pumping. Accordingly, owing to the higher power of $P_i$, in conjunction with a power $P_s$, a higher gain can be applied to a pulse oscillator (e.g., Ti:sapphire pulsed laser) compared with a gain applied to an oscillator in a conventional system (per FIGS. 7-9).

In an embodiment, FWM is a pumped pulse operation, where the pumped pulse can be 'ultra-short', e.g., about 100 femtoseconds ($1\times10^{-13}$ seconds). However, lasers which operate in the 'ultra-short' pulse duration range can exhibit timing jitter. For example, a timing jitter of about ±15 fs can be experienced when operating a laser with a mean of about 100 fs pulse duration. Hence, when utilizing separate pumps at $\omega_i$ and $\omega_s$ the timing jitter can lead to a high probability that the respective photons $\omega_{p1}$ and $\omega_{p2}$ are not aligned in both time and space.

Figure 2:
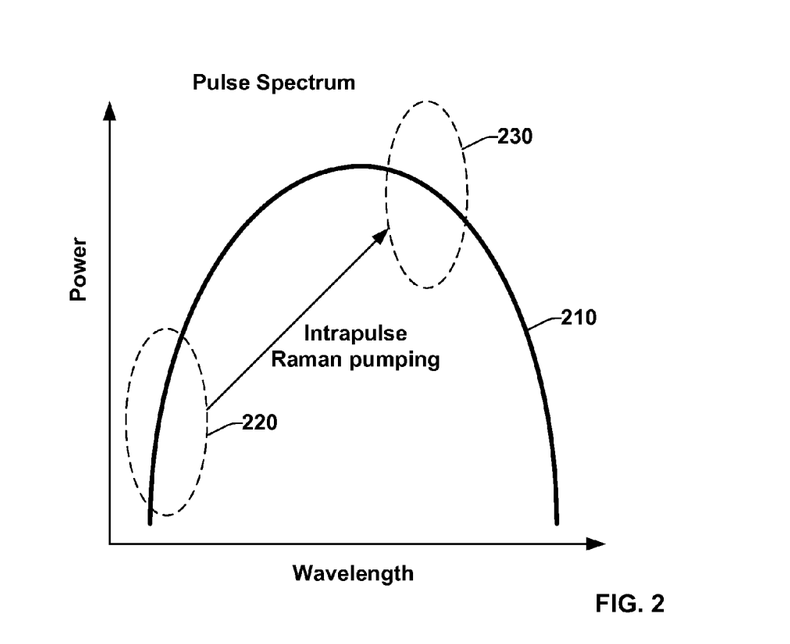
FIG. 2 is a plot depicting intrapulse Raman pumping, according to an embodiment.
Figure 3:
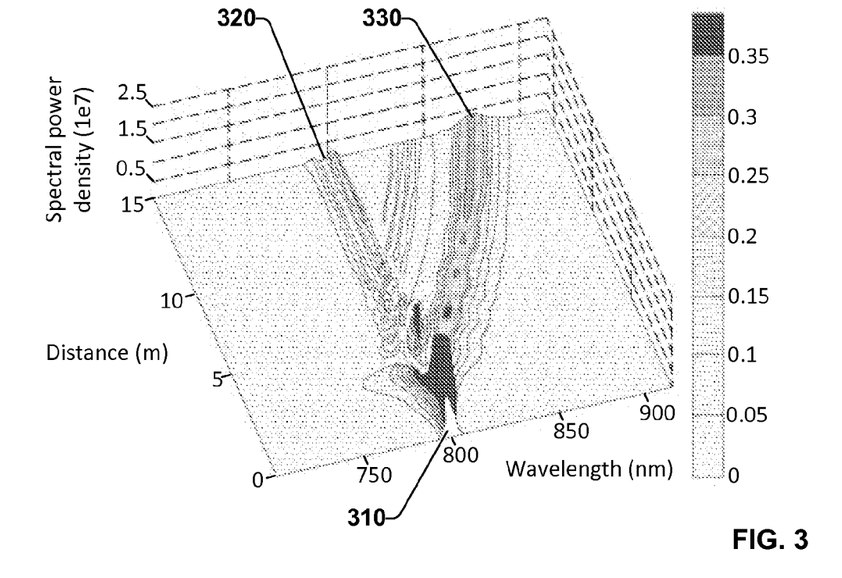
FIG. 3 is a plot of spectral power density during wavelength shifting, according to an embodiment.
Figure 4:
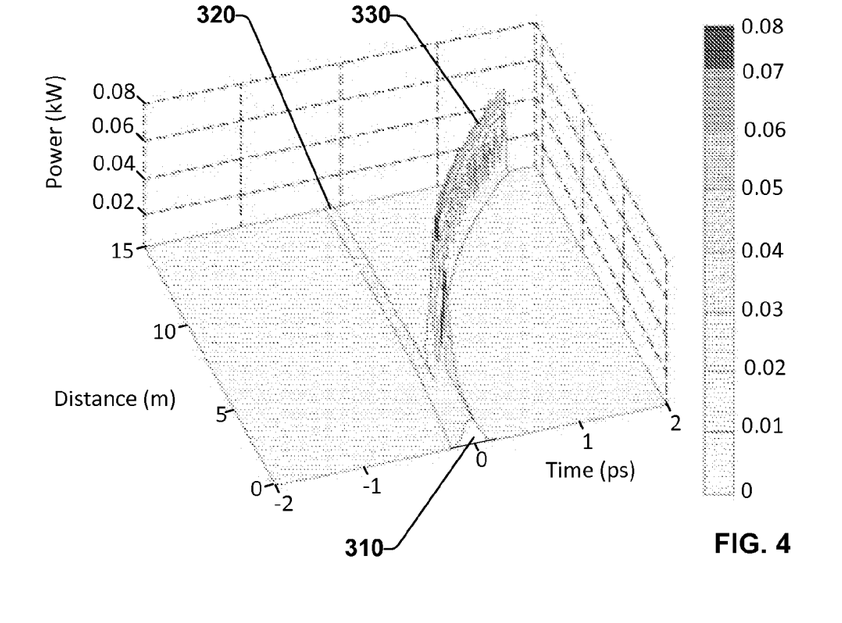
FIG. 4 is a plot of power density as a function of time during wavelength shifting, according to an embodiment.

To overcome the jitter effect, advantage can be taken of the phenomenon "self-frequency-shifted Raman soliton", which is depicted in FIGS. 2-4. FIG. 2, plot 210, illustrates the effect of intrapulse Raman pumping, according to an embodiment. As a pulse (e.g., $\omega_i$ or $\omega_s$ photon based) propagates down a fiber, the wavelength of the pulse can be shifted to a longer wavelength, as shown in plot 210, where application of intrapulse Raman pumping can lead to a pulse shift from a lower wavelength region 220 to a higher wavelength region 230. In an embodiment, region 220 can be considered a function of low power, while region 230 can be considered a function of high power.

FIGS. 3 and 4 are modeled representations of the wavelength shifting as a function of waveguide length (e.g., PCF length). FIG. 3 illustrates the shift in wavelength vs. distance with respective spectral power density. FIG. 4 illustrates the shift in time vs. distance with respective power. As illustrated in FIGS. 3 and 4, a pulse 310 originating with an example wavelength of about 800 nm can be maintained at that wavelength across the length of the waveguide, point 310→point 320. However, a pulse 310 originating with a first wavelength (e.g., in the example, about 800 nm) can also be wavelength shifted to a second wavelength (e.g., in the example, about 875 nm) as indicated by point 310→point 330, where the wavelength shifting can be a function of waveguide distance, pulse power applied to the waveguide, fiber nonlinearity, etc. Also depicted in FIGS. 3 and 4 is the spectral evolution of the pulse as it propagates down the waveguide. To facilitate wavelength shifting of the $\omega_i$ photon or the $\omega_s$ photon, an originating pulse which comprises both the $\omega_i$ photon and the $\omega_s$ photon can be split into a first waveguide leg for the $\omega_i$ photon and a second waveguide leg for the $\omega_s$ photon. Owing to the combined $\omega_i$ photon and $\omega_s$ photon based pulses being generated at a common source, the photons coincide in both time and space, however the wavelength adjustment can lead to a disparity in time, hence, a timing delay can be applied to either of the waveguide legs to facilitate a subsequent common arrival time. Continuing the example embodiment, a delay can be applied to the first, unaltered, wavelength pulse 310→320, thereby delaying the first pulse to facilitate arrival of the first pulse at a given point at the same instance as the second pulse, i.e., to compensate for the shift from 310→330.

Figure 5:
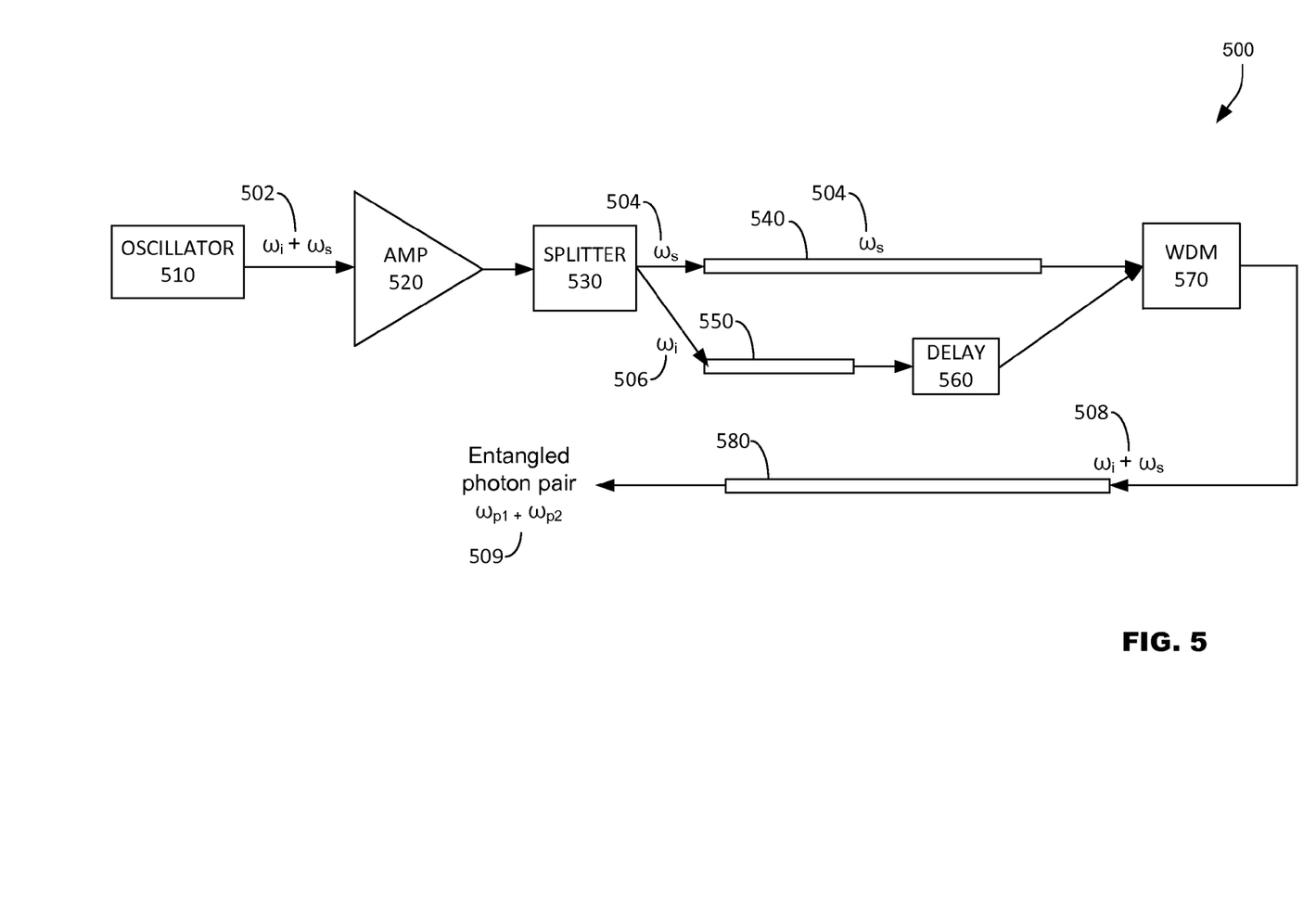
FIG. 5 is a block diagram illustrating idler and signal photons being utilized to generate photons at a pump frequency, according to an embodiment.

FIG. 5 illustrates a system 500 which can be utilized to generate photons in accordance with an embodiment. An oscillator 510 can be utilized to generate a pulse 502 (e.g., an ultrashort pulse) comprising photons $\omega_i$ and $\omega_s$. In an example embodiment, the pulse 502 can be of about 780 nm wavelength. The pulse 502 can be can be amplified at amplifier 520, whereupon a desired gain can be applied. The pulse 502 can be further split at a splitter component 530, into two pulses, $\omega_s$ photon pulse 504 and $\omega_i$ photon pulse 506, with the pulses being directed along two separate waveguide paths 540 and 550, where, in an embodiment, the waveguides can be PCFs. In another embodiment, the lengths of waveguides 540 and 550 can be a function of the material properties of the waveguide material(s) utilized to form the waveguides 540 and 550. In a further embodiment waveguides 540 and 550 can comprise the same material but have different fiber lengths, for example, the longer length waveguide 540 can have a length of about 10 m, while the shorter length waveguide 550 can have a length of about 2-3 m. Owing to the longer path length of waveguide 540, in conjunction with applying a pump power (e.g., pump power $P_s$) to the waveguide 540, the wavelength of the $\omega_s$ photon pulse 504 can be increased from about 780 nm to about 1100 nm, for example. And further, owing to the short path length of waveguide 550, in conjunction with applying a pump power (e.g., pump power $P_i$) to the waveguide 550, the wavelength of the $\omega_i$ photon pulse 506 can be increased from about 780 nm to about 900 nm. A delay line component 560 can be applied to adjust the timing of pulse 506 conveyed on waveguide 550 to facilitate arrival of the $\omega_i$ photon pulse 506 (e.g., having a wavelength of about 900 nm) at a wavelength division multiplexor (WDM) 570 at the same arrival time as the $\omega_s$ photon pulse 504 (e.g., having a wavelength of about 1100 nm) to facilitate maintaining the time and space constant of the $\omega_i$ photon pulse 506 and the $\omega_s$ photon pulse 504. The WDM 570 can be utilized to combine the $\omega_s$ photon pulse 504 and the $\omega_i$ photon pulse 506 to form photon pulse 508 comprising photons $\omega_i$ and $\omega_s$. The WDM 570 can be connected to a third waveguide, waveguide 580, which can be of similar or disparate material to that utilized for waveguides 540 and 550. In an embodiment, waveguide 580 can have a fiber length, photonic crystal structure, etc., which can be designed to satisfy the energy conservation requirement and momentum conservation requirements to facilitate matching of the photon pair $\omega_i$ and $\omega_s$ comprising photon pulse 508, e.g., to enable desired values of $k_s$, $k_i$, and $k_p$ to be obtained, and hence a high and efficient rate of generation of photon entangled pairs. In an exemplary embodiment, the length of waveguide 580 can be of about 50 cm to about 1 m. Effectively waveguide 580 acts to mix the photon pair $\omega_i$ and $\omega_s$ to facilitate generation of the $\omega_{p1}$ and $\omega_{p2}$ photon pair 509.

It is to be appreciated that the various presented parameters such as pump powers, waveguide nonlinearities, waveguide lengths, waveguide core size, waveguide material(s), photon wavelengths, photon frequencies, etc., are simply example values and any suitable value can be utilized to achieve a required effect in accordance with the one or more embodiments presented herein. For example, to obtain a particular wavelength(s), a combination of waveguide nonlinearity, waveguide length and pump power can be utilized as required.

The various embodiments can be applied to any application requiring a pure signal comprising an entangled pair of photons (e.g., with a high coincidence/accident ratio). Furthermore, generation of the pair of photons can be achieved with a high rate of efficiency. Such applications can include a quantum communication application, a quantum repeater application, a quantum computation, a entanglement distillation application, etc.

Figure 6:
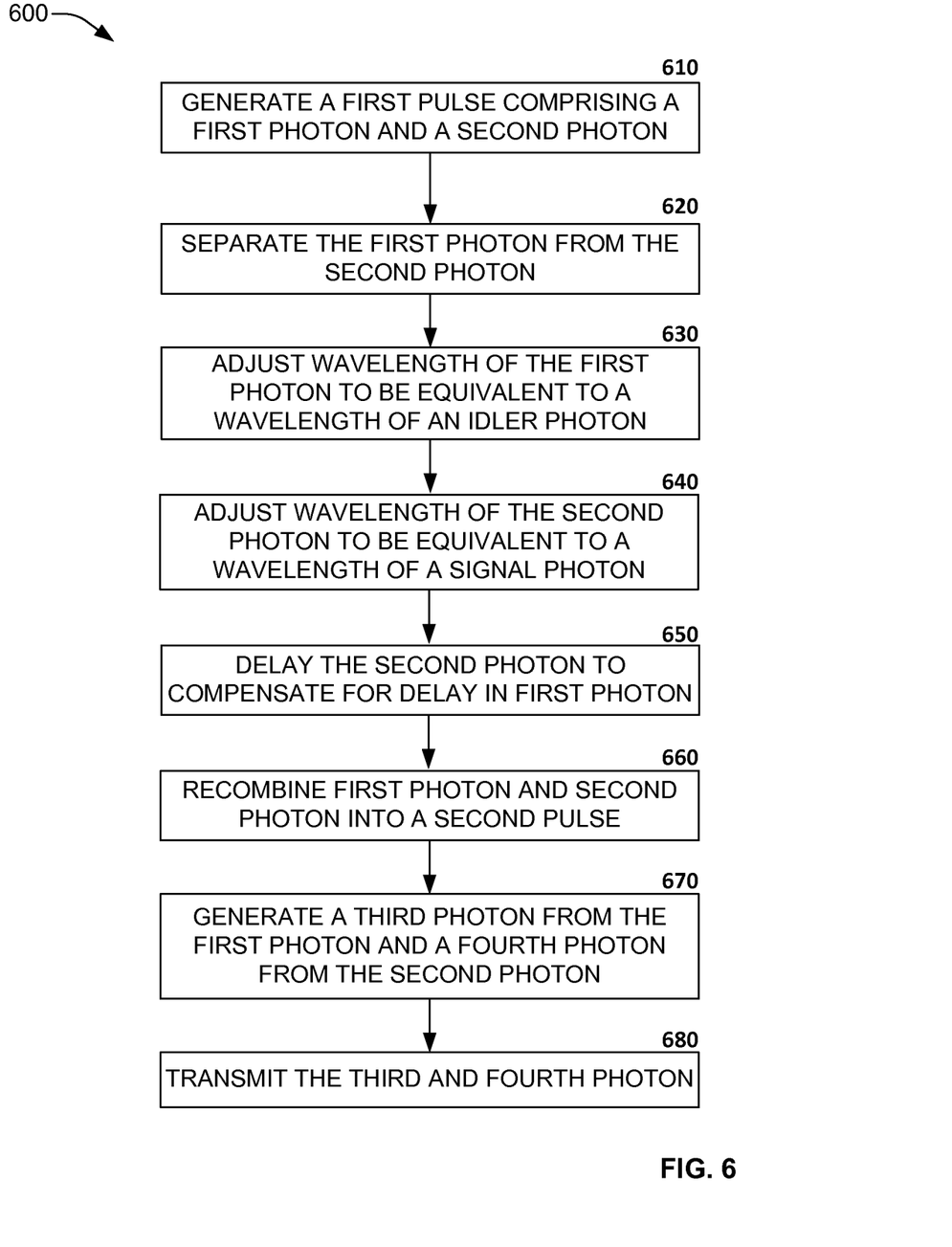
FIG. 6 is a flow diagram illustrating an exemplary methodology for utilizing idler and signal photons to generate photons at a pump frequency, according to an embodiment.

FIG. 6 is a methodology 600 relating to generation of a photon either as a single photon, or a photon pair. While the methodology 600 is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

At 610, a first pulse can be generated comprising of a first photon and a second photon. Generation of the respective photons can be by any suitable system, e.g., an OPO.

At 620, the first photon can be separated from the second photon (e.g., by a splitter component) to facilitate processing of the first photon separate from the second photon.

At 630, the wavelength of the first photon can be adjusted. In an embodiment, the first photon can be considered to be a signal photon. As previously described, the wavelength can be adjusted by transmitting the first photon along a first waveguide of a particular length to facilitate adjustment of the wavelength of the first photon. Further, if required, a pump pulse can be applied to the first photon to further facilitate shifting of the first photon from a first wavelength to a second wavelength.

At 640, the wavelength of the second photon can be adjusted. In an embodiment the second photon can be considered to be an idler photon. As previously described, the wavelength can be adjusted by transmitting the second photon along a second waveguide of a particular length to facilitate adjustment of the wavelength of the second photon, wherein the length of the second waveguide is different to the length of the first waveguide. For example, the length of the second waveguide can be shorter than the length of the first waveguide. Further, if required, a pump pulse can be applied to the second photon to further facilitate shifting of the second photon from a first wavelength to a second wavelength. As previously described, the pump power applied to the idler photon can be larger than the pump power applied to the signal photon.

At 650, a timing delay can be applied to the second, idler, photon to compensate for the extra time it takes for the first, signal, photon to traverse through the first waveguide. Application of a timing delay to the second photon facilitates arrival of the second photon at a WDM at the same time as the first photon.

At 660, the first photon and the second photon can be recombined at the WDM to form a single pulse.

At 670, the first photon and the second photon can be transmitted into a third waveguide to facilitate generation of a third photon and a fourth photon from the first and second photons. The third photon and fourth photon can have a frequency equivalent to a pump frequency.

At 680, the third photon and fourth photon can be transmitted. Owing to the nature of energy transfer in the four-wave mixing process, the third photon and fourth photon are entangled in photon numbers. Furthermore, owing to the avoidance of deleterious effects that can arise as a result of Raman scattering (e.g., two photons formed from a single incident photon) only a pair of photons, the third photon and the fourth photon, are transmitted across a system, e.g., a quantum communication application, and hence energy conservation and momentum of conservation are maintained.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   forming an idler photon, wherein the idler photon has a first resonant frequency;
   forming a signal photon, wherein the signal photon has a second resonant frequency; and
   combining the idler photon and the signal photon to form a pair of pump photons, wherein the pump photons have a third resonant frequency, the first resonant frequency is less than the third resonant frequency, and the third resonant frequency is less than the second resonant frequency.

2. The method of claim 1, wherein the idler photon and signal photon are generated to coincide in both time and space.

3. The method of claim 1, wherein the pair of pump photons are formed as an entangled pair.

4. The method of claim 1, further comprising, prior to combining the idler photon and the signal photon to form a pair of pump photons, adjusting a first wavelength of the idler photon to a second wavelength by transmitting the idler photon along a first waveguide and adjusting a third wavelength of the signal photon to a fourth wavelength by transmitting the signal photon along a second waveguide, wherein a length of first waveguide is different to a length of the second waveguide.

5. The method of claim 4, further comprising applying a timing delay to the idler photon at the first waveguide to facilitate compensating for a difference in transmission time between the signal photon being transmitted along the second waveguide and the idler photon being transmitted along the first waveguide.

6. The method of claim 5, further comprising, after the idler photon exiting the first waveguide and the signal photon exiting the second waveguide, combining the idler photon and the signal photon to form a single pulse.

7. The method of claim 6, further comprising transmitting the idler photon and the signal photon in the single pulse along a third waveguide, the idler photon and the signal photon interacting with the third waveguide facilitating formation of the pair of pump photons.

8. The method of claim 4, wherein the first wavelength and third wavelength are equal.

9. The method of claim 4, wherein the first wavelength is about 780 nm, the second wavelength is about 1100 nm, the third wavelength is about 780 nm, and the fourth wavelength is about 900 nm.

10. A system, comprising:
    an idler photon having a first resonant frequency;
    a signal photon having a second resonant frequency; and
    a waveguide configured to interact with the idler photon and the signal photon to form a pair of pump photons, wherein the pump photons have a third resonant frequency, the first resonant frequency is less than the third resonant frequency, and the third resonant frequency is less than the second resonant frequency.

11. The system of claim 10, further comprising an oscillator configured to generate the idler photon and the signal photon as an entangled pair.

12. The system of claim 10, further comprising a splitter component configured to direct the idler photon to a first waveguide and the signal photon to a second waveguide.

13. The system of claim 12, wherein the first waveguide has a first length and the second waveguide has a second length, the first length and second length are different.

14. The system of claim 12, wherein an interaction between the idler photon and the first waveguide causes a wavelength of the idler photon to shift from a first wavelength to a second wavelength.

15. The system of claim 12, wherein an interaction between the signal photon and the second waveguide causes a wavelength of the signal photon to shift from a third wavelength to a fourth wavelength.

16. The system of claim 12, further comprising a delay component configured to adjust a timing of the idler photon to compensate for a difference in duration between the signal photon traversing the second waveguide and the idler photon traversing the first waveguide.

17. The system of claim 16, further comprising a multiplexer configured to combine the idler photon with the signal photon to form a single pulse comprising the idler photon and the signal photon, wherein the multiplexor is located to receive the idler photon from the first waveguide and the signal photon from the second waveguide and is further configured to direct the single pulse into the waveguide.

* * * * *